United States Patent
Summers et al.

(10) Patent No.: US 8,230,332 B2
(45) Date of Patent: Jul. 24, 2012

(54) INTERACTIVE USER INTERFACE FOR CONVERTING UNSTRUCTURED DOCUMENTS

(75) Inventors: Nathan Summers, Springfield, VA (US); Shawn Rush, Arlintgon, VA (US); James Andreassi, Silver Spring, MD (US)

(73) Assignee: Compsci Resources, LLC, Alexandria, VA (US)

( * ) Notice: Subject to any disclaimer, the term of this patent is extended or adjusted under 35 U.S.C. 154(b) by 257 days.

(21) Appl. No.: 12/538,343

(22) Filed: Aug. 10, 2009

(65) Prior Publication Data

US 2010/0031141 A1  Feb. 4, 2010

Related U.S. Application Data

(63) Continuation-in-part of application No. 12/477,789, filed on Jun. 3, 2009, which is a continuation-in-part of application No. 12/041,961, filed on Mar. 4, 2008, which is a continuation-in-part of application No. 11/848,007, filed on Aug. 30, 2007.

(60) Provisional application No. 60/824,062, filed on Aug. 30, 2006.

(51) Int. Cl.
   *G06F 17/00* (2006.01)
(52) U.S. Cl. ........................ 715/239; 715/241
(58) Field of Classification Search .................. 715/234, 715/235, 237, 239, 241, 248
   See application file for complete search history.

(56) References Cited

U.S. PATENT DOCUMENTS

| | | | |
|---|---|---|---|
| 7,415,482 B2 * | 8/2008 | Blake et al. | ........................... 1/1 |
| 2003/0149934 A1 * | 8/2003 | Worden | ........................ 715/513 |
| 2005/0144166 A1 | 6/2005 | Chapus et al. | |
| 2005/0171970 A1 | 8/2005 | Ozzie et al. | |
| 2006/0041492 A1 | 2/2006 | Takahashi et al. | |
| 2006/0184539 A1 * | 8/2006 | Blake et al. | ..................... 707/10 |
| 2007/0050702 A1 | 3/2007 | Chopin et al. | |
| 2007/0055596 A1 * | 3/2007 | Yankovich et al. | ............. 705/35 |

(Continued)

FOREIGN PATENT DOCUMENTS

| | | |
|---|---|---|
| JP | 2003-256455 | 9/2003 |
| KR | 10-0566498 | 3/2006 |
| WO | WO 02/059755 | 8/2002 |

(Continued)

OTHER PUBLICATIONS

Lara, Ruiben, et al, "XBRL Taxonomies and OWL Ontologies for Investment Funds", Advances in Conceptual Modeling, Tecnologia Informacion y Finanzas, 2006, Madrid, Spain, pp. 1-14.*

(Continued)

*Primary Examiner* — Laurie Ries
(74) *Attorney, Agent, or Firm* — Stephen J. Weyer, Esq.; Stites & Harbison PLLC

(57) ABSTRACT

An interactive interface facilitates the conversion of unstructured documents into XML-compliant documents. A document is parsed to identify fact items in the content of the document. A classifier associates initial labels with an identified fact items, and the fact items and associated initial labels are forwarded to a user for review and correction. An interface executing on a client computer presents the initial labels associated with fact items, and enables a user to correct the labels associated with the identified fact items. Upon receipt of corrected labels from the user, the classifier is trained to update probable associations of labels and fact items in accordance with the corrected labels. The interface enables the user to enter new labels and/or concepts for a taxonomy, and an extension to the taxonomy is automatically generated.

27 Claims, 18 Drawing Sheets

U.S. PATENT DOCUMENTS

| | | | |
|---|---|---|---|
| 2007/0061129 A1 | 3/2007 | Barreiro | |
| 2007/0078877 A1 | 4/2007 | Ungar et al. | |
| 2007/0244775 A1* | 10/2007 | Linder | 705/35 |
| 2008/0052613 A1 | 2/2008 | Maine | |
| 2008/0059482 A1* | 3/2008 | Rohan et al. | 707/10 |
| 2008/0059511 A1 | 3/2008 | Summers et al. | |
| 2008/0270312 A1* | 10/2008 | Ohata | 705/76 |
| 2009/0064040 A1* | 3/2009 | Wolf et al. | 715/810 |

OTHER PUBLICATIONS

Sergio De La Fe, Jr. et al., "XBRL Taxonomy-Financial Reporting for Commercial and Industrial Companies, US GAAP" http://www.xbrl.org/Taxonomy/us-gaap-ci-2000-07-31, 12 pages.

Shimura et al., "Storage and Retrieval of XML Documents Using Object-Relational Databases" Proc. of the 10th International Conference on Database and Expert Systems Applications (DEXA'99), Lecture Notes in Computer Science, 1999, vol. 1677, pp. 206-217.

Notification of Transmittal of the International Search Report and Written Opinion of the International Searching Authority Forms (PCT/ISA/220, PCT/ISA/210 and PCT/ISA/237) issued in corresponding International Application No. PCT/US2007/019035 dated Jan. 4, 2008.

International Search Report and Written Opinion of the International Searching Authority issued Apr. 28, 2011 for International Application No. PCT/US2010/002180, Korean Intellectual Property Office, Daejeon, Republic of Korea.

* cited by examiner

| Print | | |
|---|---|---|
| ABC Corporation, Inc. | | |
| 8-K 08/15/XXXX | | |
| Download as Excel Spreadsheet | | |
| Collapse All \| Expand All \| View Bar Chart | | |
| ⊟ Statement of Financial Position<br>USD amounts shown in 1,000,000s | 7/01/XX | 12/31/XX |
| Statement of Financial Position | | |
| ⊞ Assets | 110,403 | 114,837 |
| ⊟ Liabilities and Stockholder's Equity | 110,403 | 114,837 |

Expand All \| View Bar Chart

⊞ Income Statement

Expand All \| View Bar Chart

⊞ Statement of Cash Flows

Expand All \| View Bar Chart

⊞ Statement of Stockholder's Equity

Expand All \| View Bar Chart

⊞ Cash Flow from Operations - Direct Method

Expand All \| View Bar Chart

⊞ Cash Flow from Operations - Indirect Method

Done

FIG. 3B

| ⊙ | | |
|---|---|---|
| Print | | |
| ABC Corporation, Inc.<br>8-K 08/15/XXXX<br>Download as Excel Spreadsheet<br>Collapse All \| Expand All \| View Bar Chart | | |
| ⊟ Statement of Financial Position<br>　USD amounts shown in 1,000,000s | 7/01/XX | 12/31/XX |
| Statement of Financial Position | | |
| ⊟ Assets | | |
| 　⊞ Assets - Current | 41,622 | 46,949 |
| 　Assets - Noncurrent | | |
| 　Long-term investments and loans | 5,067 | 3,892 |
| 　Property plant and equipment, less accumulated depreciation | 16,298 | 16,632 |
| 　Intangible Assets | | |
| 　　Goodwill | 20,985 | 20,876 |
| 　　Intangible Assets (Excluding Goodwill) | 22,902 | 24,350 |
| 　Other assets, deferred taxes and deferred charges | 3,529 | 2,138 |
| 　Assets - Total | 110,403 | 114,837 |
| ⊞ Liabilities and Stockholder's Equity | 110,403 | 114,837 |
| Expand All \| View Bar Chart | | |
| ⊞ Income Statement | | |
| Done | | |

FIG. 3C

| Print | | | |
|---|---|---|---|
| ABC Corporation, Inc. <br> 8-K 08/15/XXXX <br> Download as Excel Spreadsheet <br> Collapse All \| Expand All \| View Bar Chart | | | |
| ⊟ Statement of Financial Position<br>USD amounts shown in 1,000,000s | | 7/01/XX | 12/31/XX |
| Statement of Financial Position | | | |
| ⊟ Assets | | | |
| ⊟ Assets - Current | | | |
| Cash, Cash Equivalents and Short-Term Investments | | | |
| Cash and cash equivalents at end of period | | 2,138 | 1,827 |
| Short-term investments | | 20,115 | 25,886 |
| Accounts and Notes Receivable, Net | | 9,497 | 9,392 |
| Short-term loans | | 540 | 514 |
| Inventories, Net | | 5,734 | 6,111 |
| Prepaid expenses and taxes | | 3,564 | 3,157 |
| Assets of discontinued operations and other assets held for sale | | 34 | 62 |
| Total current assets | | 41,622 | 45,949 |
| Assets - Noncurrent | | | |
| Long-term investments and loans | | 5,067 | 3,892 |
| Property, plant and equipment, less accumulated depreciation | | 16,298 | 15,632 |
| Intangible Assets | | | |
| Goodwill | | 20,985 | 20,875 |
| Intangible Assets (Excluding Goodwill) | | 22,902 | 24,350 |
| Other assets, deferred taxes and deferred charges | | 3,529 | 2,138 |
| Assets - Total | | 11,403 | 114,837 |
| ⊞ Liabilities and Stockholder's Equity | | 11,403 | 114,837 |
| Done | | | |

FIG. 3D

[Print]

ABC Corporation, Inc.
8-K 08/15/XXXX    34
Download as Excel Spreadsheet
Collapse All | Expand All | View Bar Chart

| Statement of Financial Position<br>USD amounts shown in 1,000,000s | 7/01/XX | 12/31/XX |
|---|---|---|
| Statement of Financial Position | | |
| ☐ Assets | | |
| ☐ Assets - Current | | |
| Cash, Cash Equivalents and Short-Term Investments | | |
| Cash and cash equivalents at end of period | 2,138 | 1,827 |
| Short-term investments | 20,115 | 25,886 |
| Accounts and Notes Receivable, Net | 9,497 | 9,392 |
| Short-term loans | 540 | 514 |
| Inventories, Net | 5,734 | 6,111 |
| Prepaid expenses and taxes | 3,564 | 3,157 |
| Assets of discontinued operations and other assets held for sale | 34 | 62 |
| Total current assets | 41,622 | 45,949 |
| Assets - Noncurrent | | |
| Long-term investments and loans | 5,067 | 3,892 |
| Property; plant and equipment, less accumulated depreciation | 16,298 | 15,632 |
| Intangible Assets | | |
| Goodwill | 20,985 | 20,875 |
| Intangible Assets (Excluding Goodwill) | 22,902 | 24,350 |
| Other assets, deferred taxes and deferred charges | 3,529 | 2,138 |
| Assets - Total | 110,403 | 114,837 |
| ☐ Liabilities and Stockholder's Equity | | |
| ☐ Liabilities | | |
| ☐ Current Liabilities | | |
| Short-term borrowings, including current portion or long-term debt | 2,432 | 2,434 |
| Accounts payable | 1,845 | 2,019 |

Done

```xml
<linkbase xmlns="http://www.xbrl.org/2003/linkbase"
          xmlns:xbrli="http://www.xbrl.org/2003/instance"
          xmlns:xlink="http://www.w3.org/1999/xlink"
          xmlns:xsi="http://www.w3.org/2001/XMLSchema-instance"
          xsi:schemaLocation="http://www.xbrl.org/2003/linkbase
http://www.xbrl.org/2003/xbrl-linkbase-2003-12-31.xsd">
    <labelLink xlink:type="extended"
xlink:role="http://www.xbrl.org/2003/role/link">

<loc xlink:label="Assets_loc" xlink:type="locator"
        xlink:href="taxonomy.xsd#assets"/>

<labelArc xlink:from="Assets_loc"
        xlink:to="Assets_label" xlink:type="arc"
        xlink:arcrole="http://www.xbrl.org/2003/arcrole/concept-label"/>

<label xlink:label="Assets_label" xlink:type="resource"
        xlink:role="http://www.xbrl.org/2003/role/label"
        xml:lang="en">Assets</label>
        <label xlink:label="Assets_label" xlink:type="resource"
        xlink:role="http://www.xbrl.org/2003/role/label"
        xml:lang="es">Activo</label>
        <label xlink:label="Assets_label" xlink:type="resource"
        xlink:role="http://www.xbrl.org/2003/role/label"
        xml:lang="fr">Actif</label>
    <label xlink:label="Assets_label" xlink:type="resource"
        xlink:role="http://www.xbrl.org/2003/role/label"
        xml:lang="de">Aktiva</label>
    </labelLink>
</linkbase>
```

| | | Company X 12/31/XXXX | Company Y 12/31/XXXX | Com 12/ |
|---|---|---|---|---|
| Balance sheet after appropriation | | | | |
| Assets | | | | |
| ⊟ Fixed assets | | | | |
| | Formation expenses | | 5,452 | |
| | Intangible fixed assets | 68,674 | 30,340 | |
| | ⊟ Tangible fixed assets | | | |
| | Land and Buildings | 123,393 | 143,778 | |
| | Plant, machinery and equipment | 1,385,049 | 1,464,026 | |
| | Furniture and vehicles | 10,582 | 29,103 | |
| | Leasings and similar rights | 4,283 | 5,706 | |
| | Other tangibles fixed assets | 511 | 528 | |
| | Assets under construction and advance payments | | | |
| | ⊟ Financial fixed assets | 31,137 | 51,824 | |
| | ⊟ Affiliated enterprises | | | |

Sidebar:
- ⊟ XBRL Documents
  - ☐ Document ABC
  - ☑ Document XYZ
  - ☐ Document 123
  - ☐ Document JKL
  - ☐ Document 456
  - ☐ Document 789

Toolbar:
- Print
- Download as Excel Spreadsheet
- Select Language: English ▾ (Deutsch, Español, English, Français)
- Collapse | View Bar C...
- ☐ Balance sheet after appropriation

FIG. 7B

Document [/home/jandreas/workspace/IC/test/data/corpus-source/UNM/d10k.htm] [Browse...] [Upload Document] [Tag Document as...] [Convert Document]

Deselect all Sections   *Ctrl click to select and deselect sections of the document Table of Contents

*CONSOLIDATED STATEMENTS OF COMPREHENSIVE INCOME (LOSS)*

|  | Year Ended December 31 | | |
|---|---|---|---|
|  | 2007 | 2006 | 2005 |
|  | (in millions of dollars) | | |
| Net Income | $ 679.3 | $ 411.0 | $ 513.6 |
| Other Comprehensive Income (Loss) | | | |
| Change in Net Unrealized Gain on Securities Before Reclassification Adjustment (net of tax benefit of $134.6; $323.3, $144.5) | (248.8) | (613.0) | (261.8) |
| Reclassification Adjustment for Net Realized Investment (Gain) Loss (net of tax expense (benefit) of $0.2; $(0.3); $6.6) | 0.3 | (0.6) | 12.3 |
| Change in Net Gain on Cash Flow Hedges (net of tax expense (benefit) of $(6.0); $(39.8); $19.7) | (11.7) | (79.1) | 36.4 |
| Change in Adjustment to Reserves for Future Policy and Contract Benefits, Net of Reinsurance (net of tax expense (benefit) of $34.0; $50.5; $(10.0)) | 69.8 | 107.7 | (19.6) |
| Change in Foreign Currency Translation Adjustment (net of tax benefit of $; $0.3; $0.2) | 7.4 | 93.6 | (73.9) |
| Change in Unrecognized Pension and Postretirement Benefit Costs | | | |

Tag Document

Document: /home/jandreas/    Convert Document
Deselect All Sections *Ctrl cl

*CONSOLIDATED STATEMENTS*

Net Income

Other comprehensive Income (Loss)

Change in Net Unrealized Gain on Securities Before Reclassification Adjustment
(net of tax benefit of $134.6; $323.3; $144.5)

Reclassification Adjustment for Net Realized Investment (Gain) Loss
(net of tax expense (benefit) of $0.2; $(0.3); $6.6)

Change in Net Gain on Cash Flow Hedges
(net of tax expense (benefit) of $(6.0); $(39.8); $19.7)

Change in Adjustment to Reserves for Future Policy and Contract Benefits, Net of Reinsurance
(net of tax expense (benefit) of $34.0; $50.5; $(10.0)

|  | 2007 | 2006 | 2005 |
|---|---|---|---|
|  | (In millions of dollars) | | |
|  | $ 679.3 | $ 411.0 | $ 513.6 |
|  | (248.8) | (613.0) | (261.8) |
|  | 0.3 | (0.6) | 12.3 |
|  | (11.7) | (79.1) | 35.4 |
|  | 69.8 | 107.7 | (19.6) |

| Concept | Label | Facts |
|---|---|---|
| NetIncomeLoss | Net Income | $679.3, $411.0, $513.6 |
| OtherComprehensiveIncomeUnrealize | Change in Net Unrealized Gain... | (248.8) (613.0) (261.8) |
| OtherComprehensiveIncomeReclassifi | Reclassification Adjustment for... | 0.3, (0.6), 12.3 |
| OtherComprehensiveIncomeUnrealize | Change in Net Gain on Cash F... | (11.7), (79.1), 36.4 |
| OtherComprehensiveIncomeChangeIn | Change in Adjustment to Reserve... | 69.8, 107.7, (19.6) |
| OtherComprehensiveIncomeForeignCl | Change in Foreign Currency Tra... | 7.4, 93.6, (73.9) |
| OtherComprehensiveIncomeReclassifi | Change in Unrecognized Pensi... | 33.7, 34.8, (11.0) |
| OtherComprehensiveIncomeLossNetOf | Total Other Comprehensive Loss | (149.3), (466.6), (317.6) |
| OtherComprehensiveIncomeLossNetOf | Comprehensive Income (Loss) | $530.0, $(55.6), $196.0 |

Tag   Close

| Year Ended December 31 | | |
|---|---|---|
| 2007 | 2006 | 2005 |
| $679.3 | $411.0 | $513.6 |
| (248.8) | (613.0) | (261.8) |
| 0.3 | (0.6) | 12.3 |
| (11.7) | (79.1) | 35.4 |
| 69.8 | 107.7 | (19.6) |
| 7.4 | 93.6 | (73.9) |
| 33.7 | 24.8 | (11.0) |
| (149.3) | (456.6) | (317.6) |
| $530.0 | $(55.6) | $196.0 |

FIG. 10C

| Input Data | Upload and Convert | | | | | |
|---|---|---|---|---|---|---|
| Deselect All Sections *Ctrl click (Command click on macs) to select and deselect sections of the documents, Shift click to select multiple from last selection. | | | | | | |

Select Summation Items

| | | + | – | 2007 | 2006 | 2005 |
|---|---|---|---|---|---|---|
| | Total | ☑ | ☐ | 18,269 | 17,227 | 16,313 |
| | Operating income | | | 6,193 | 5,696 | 4,854 |
| | Interest expense and income | | | | | |
| | Interest expense | ☐ | ☐ | 210 | 122 | 82 |
| | Interest income | ☐ | ☐ | (132) | (51) | (56) |
| | Total | ☐ | ☑ | 78 | 71 | 26 |
| | Income before income taxes, minority interest and cumulative effect of accounting change | | | 6,115 | 5,625 | 4,828 |
| | Provision for income taxes | ☐ | ☐ | 1,964 | 1,723 | 1,627 |
| | Minority interest | ☐ | ☐ | 55 | 51 | 55 |
| | Income before cumulative effect of accounting change | | | 4,096 | 3,851 | 3,146 |
| | Cumulative effect of accounting change | ☐ | ☐ | — | — | (35) |
| | Net income | | | 4,096 | 3,851 | 3,111 |
| | Weighted average common shares outstanding - basic | | | 718.3 | 747.5 | 764.9 |

| Label | 2007 | 2006 | 2005 |
|---|---|---|---|
| Net sales | $24,462 | $22,923 | $21,167 |
| Cost of sales | 12,735 | 11,713 | 10,408 |
| Selling, general and administrative expenses | 5,015 | 5,066 | 4,631 |
| Research, development and related expenses | 1,368 | 1,522 | 1,274 |
| Gain on sale of businesses | (849) | (1,074) | — |
| Total | 18,269 | 17,227 | 16,313 |
| Operating income | 6,193 | 5,696 | 4,854 |
| Interest expense | 210 | 122 | 82 |
| Interest income | (132) | (51) | (56) |
| Total | 78 | 71 | 26 |
| Income before income taxes, minority interest and cumulative effect of accounting change | 6,115 | 5,625 | 4,828 |

Select Items For This Total    Select Summation Items    Cancel

INTERACTIVE USER INTERFACE FOR CONVERTING UNSTRUCTURED DOCUMENTS

CROSS REFERENCE TO RELATED APPLICATIONS

This is a continuation-in-part of U.S. patent application Ser. No. 12/477,789, filed Jun. 3, 2009, which is a continuation-in-part of U.S. patent application Ser. No. 12/041,961, filed Mar. 4, 2008, which is a continuation-in-part of U.S. patent application Ser. No. 11/848,007, filed Aug. 30, 2007, the disclosures of which are incorporated herein by reference.

FIELD OF THE INVENTION

The present invention is directed to the identification, analysis and viewing of information contained in documents that conform to the extensible Markup Language (XML) standard, as well as the generation of such documents. In one embodiment, the invention can be applied to the retrieval and viewing of information contained in an extension of XML that is directed to the communication of business and financial data, known as the extensible Business Reporting Language (XBRL).

BACKGROUND OF THE INVENTION

XML and various extensions thereof, such as XBRL, are becoming widely accepted as platforms for documents that are exchanged within groups. By conforming to the XML standard, a document is structured in a manner that enables the information therein to be readily identified and displayed in a desired format for viewing purposes. The XBRL standard provides a good example of this functionality in the context of business and financial data. The structure of the data is defined by metadata that is described in Taxonomies. The Taxonomies capture the definition of individual elements of financial data, as well as the relationships between them. Within a document, these elements are identified by tags. The extensible nature of the language permits users to define custom Taxonomies, allowing for potentially infinite kinds of metadata.

Significant efforts are currently underway to adopt XBRL as a replacement for paper-based financial data collection, and various electronic mechanisms for financial data reporting. In the United States, for example, the Federal Deposit Insurance Corporation (FDIC) has instituted a project in which banks and similar types of financial institutions employ a form-based template to submit data in an XBRL format. The Securities and Exchange Commission (SEC) also has a project for the disclosure of company financial performance information, utilizing XBRL. This information can then be downloaded online, by authorized entities. Other users of XBRL-formatted information include companies that disseminate financial news. The XBRL format enables the various companies to distribute the financial information on a common platform.

It can be appreciated that, as the XBRL format is adopted for these types of uses, large collections of business and financial performance information in this format will be amassed. There is a growing need for an efficient mechanism to process and retrieve stored information from such a large collection.

In the past, the typical approach for information retrieval within a large repository of documents is to pre-parse each document in its entirety, and store the parsed information in another storage medium, such as a relational database. The database, rather than the documents themselves, then functions as the source of information that is searched to obtain data responsive to a request. Such an approach significantly increases storage requirements, since each item of information is stored twice, namely in the original document and in the parsed form. In addition, the information is not immediately available as soon as the document is loaded into the repository. Rather, the need to pre-process the document, to extract each item of information and store it in the database, results in a delay before the information contained in the document can be retrieved in response to a query.

Furthermore, since the information is stored in a database for retrieval, it is not readily adaptable to changes in the source documents or taxonomies. For example, if a new extension is created for the XBRL standard, the schema of the database needs to be redesigned to accommodate the extension. Until that is completed and the data is reloaded, queries cannot be based upon the extended features of the standard.

SUMMARY OF THE INVENTION

In accordance with one aspect of the invention disclosed herein, data that is present in a tagged format, such as XML data and XBRL data, can be dynamically accessed on demand. The data is obtained directly from the original document, thereby avoiding the need to pre-parse entire documents before the information can be retrieved.

In accordance with another aspect of the invention, a user interface is provided to assist a user in converting an unstructured document into a tagged format for analysis and viewing, and to automatically generate extensions for taxonomies.

The manner in which these results are achieved is explained hereinafter with reference to exemplary embodiments illustrated in the accompanying drawings. It should be appreciated that, while specific examples are described with respect to the identification and retrieval of information in XBRL-formatted documents, the concepts described herein are not limited to that particular application. Rather, they can be employed in the context of any type of data that conforms to the XML specification and any of its extensions.

BRIEF DESCRIPTION OF THE DRAWINGS

FIGS. 3A-3E illustrate examples of the display of results returned from a query;

FIG. 4 illustrates presentation of data in a graph form;

FIG. 5 is an illustration of a user interface in which financial data can be viewed in a dimensional manner;

FIG. 6 is a representation of an XBRL label linkbase;

FIGS. 7A and 7B illustrate examples of data presented in two different languages;

FIGS. 9A and 9B illustrate screen images of an exemplary user interface for converting an unstructured document into an XML-compliant format;

FIGS. 10B and 10C illustrate exemplary user interfaces for automatically generating extension linkbases.

DETAILED DESCRIPTION

To facilitate an understanding of the concepts underlying the present invention, they are described hereinafter with reference to their implementation in the context of accessing information contained in XBRL-formatted documents. It will be appreciated, however, that this implementation is but one example of the practical applications of the invention. More generally, the invention is applicable to the retrieval of information that is presented in a format containing metadata that identifies each element of information. In particular, the invention is applicable to collections of XML-formatted documents, as well as each of the specific implementations of XML, such as XBRL. The following discussion should therefore be viewed as illustrative, without limiting the scope of the invention.

Figure 1:
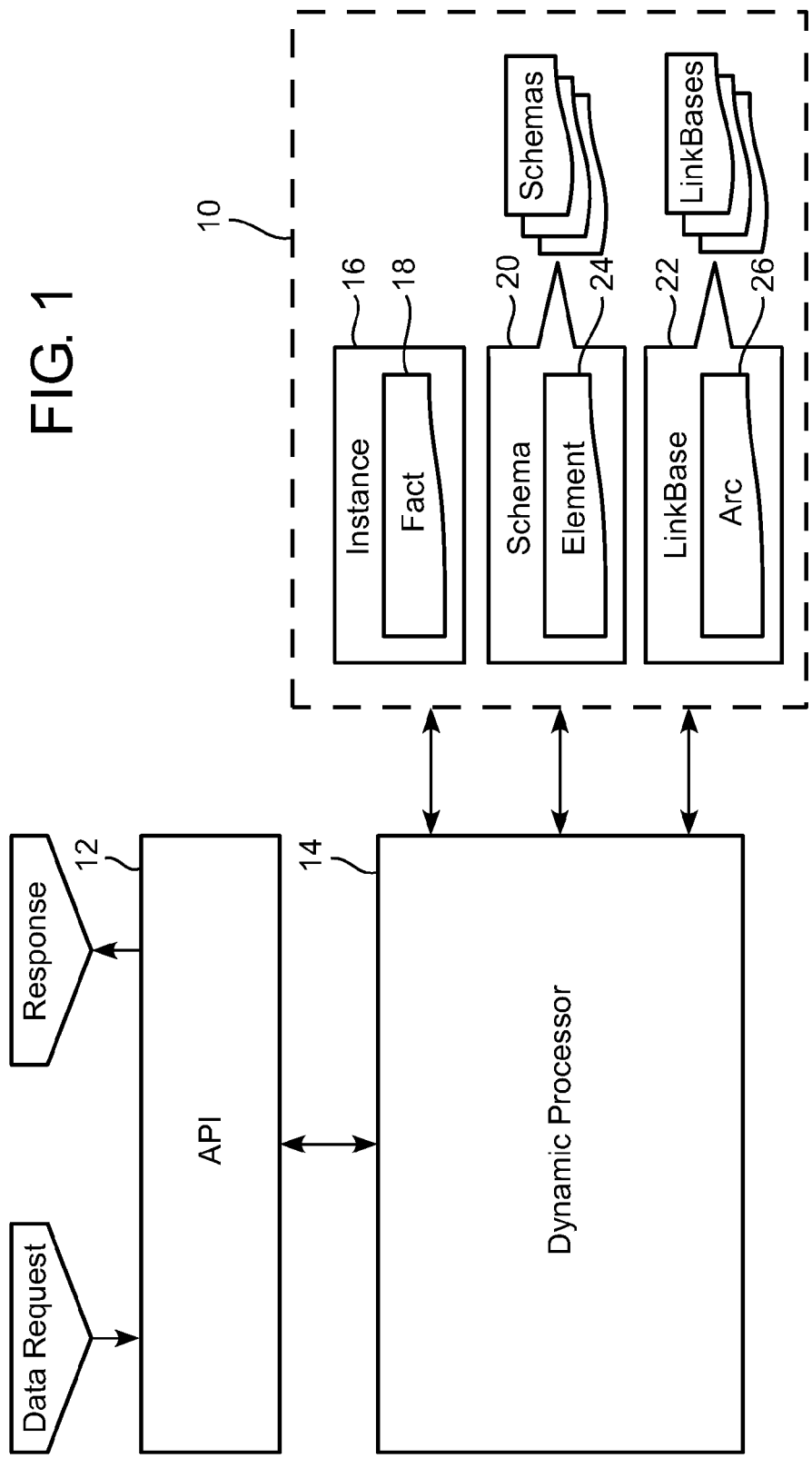
FIG. 1 is a schematic diagram of the architecture of a system for accessing XBRL-formatted documents.

FIG. 1 illustrates the basic architecture of a system for access to XBRL documents, which implements the present invention. The fundamental components of the system comprise a repository 10 containing the XBRL documents, an application programming interface (API) 12 via which a user enters requests for information contained in those documents, and receives responses to the requests, for example by means of a browser, and a dynamic processor 14 that is responsive to a request received via the API, to retrieve information from the documents, and return it via the API 12.

XBRL is comprised of two fundamental components, namely an instance document 16, which contains business and financial facts, and a collection of Taxomomies, which define metadata about these facts. Each business fact 18 comprises a single value. In addition to facts, an instance document might contain contexts, which define the entity to which the fact applies, the period of time to which it pertains, and/or whether the fact is actual, projected, budgeted, etc. The instance document might also contain units that define the unit of measurement for the numeric facts that are presented within the document, as well as footnotes providing additional information about the fact, and references to Taxonomies.

The Taxonomies comprise a collection of XML Schema documents 20 and XLink linkbase documents 22. A schema defines facts by means of elements 24. For example, an element might indicate what type of data a fact contains, e.g., monetary, numeric, textual, etc.

A linkbase is a collection of links. A link contains locators, that provide arbitrary labels for elements, and arcs 26, which indicate that an element links to another element, by referencing the labels defined by the locators.

Figure 2:
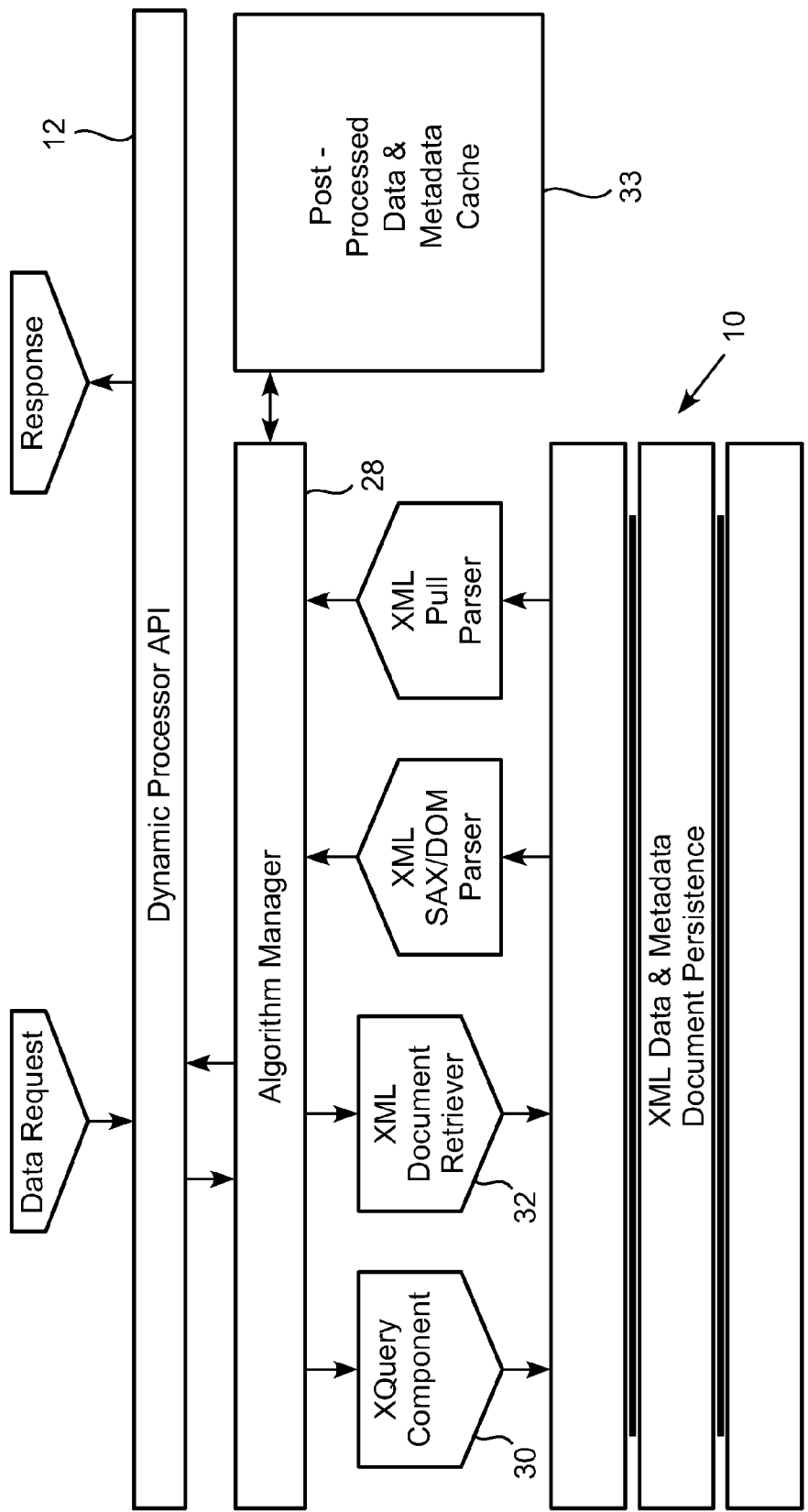
FIG. 2 is a schematic diagram illustrating the components of the dynamic processor.

A more detailed view of the dynamic processor is illustrated in FIG. 2. A request for information is presented to the API 12, for example via a browser. This request, in the form of query, can be of a variety of different types. For example, one type of query might request a particular item of data for a number of different companies, e.g., annual revenue for all companies in the beverage industry. Another type of query may request all data for a given company of interest, or data over a particular time span, such as the ten-year revenue growth for a particular company. The API presents these requests to the dynamic processor 14, for example, in the form of a function call with parameters that identify the particular items of interest in the request.

The dynamic processor contains a number of pre-fabricated algorithms that are executed by an algorithm manager 28. Each algorithm is designed to retrieve information in response to a particular type of request. In essence, each algorithm implements a particular type of search strategy. For example, one algorithm can function to retrieve all items from a collection of documents, e.g., all data relating to a particular company. Another algorithm can function to retrieve the metadata associated with a particular fact.

The algorithms perform multi-step processes to first examine the metadata to obtain information about the semantics and structure of the instance documents, and then retrieve the appropriate metadata and data items from the XBRL documents that are responsive to the request. An illustrative example of the process performed by the algorithms is set forth hereinafter in the context of a request to provide the balance sheet of a designated entity.

In response to the request, the algorithm which corresponds to that type of request sends a query, for example using an XQuery language component 30, to a presentation linkbase in the Taxonomies, to locate presentation links that correspond to the sections of a balance sheet. It should be noted that, due to the extensible nature of XBRL, the Taxonomies that are applicable to a given filing could comprise multiple sets of Taxonomy documents. There could be a standard Taxonomy that is associated with the entity to which filings are presented. For instance, the SEC might establish a standard Taxonomy containing presentation links for balance sheet data. The documents for this standard Taxonomy might be stored in a known location within the repository. In addition, the entity submitting a filing could include custom Taxonomy documents with the instance documents that it submits. The custom Taxonomy constitutes an extension of the standard Taxonomy established by the SEC. In operation, the algorithm first goes to the standard Taxonomy to locate the appropriate presentation links.

Once the presentation links have been located, the algorithm then identifies concepts that are referenced by the presentation links, e.g. assets, current assets, non-current assets, etc.

Using these concepts and entities, and any other qualifiers such as specific date or date range, the algorithm employs an XML document retriever 32 to locate corresponding items in the instance documents.

As a result of these steps, the algorithm discovers instance documents that contain the relevant data. In some cases, these documents may point to links in custom Taxonomies. In such a situation, these custom links are merged with the standard links, to obtain additional concepts.

Using the concepts, presentation links and preferred label attributes contained in the presentation links, the algorithm locates labels for the data in a label linkbase.

The algorithm returns the labels, presentation structure and data, e.g. numbers, to the API, to be formatted and presented to the user via the browser.

As an alternative to using XQuery, the dynamic processor can employ a different technology such as SAX (Simple API for XML) or XML Pull Parsing, or a combination of such technologies, to retrieve information from the XBRL instance documents and Taxonomy documents.

The dynamic processor preferably includes a cache 33 for storing information that has been retrieved and returned via the API. This cached data can be used to reduce the time needed to respond to subsequent requests that seek some, or all, of the information that was returned in response to a previous request, and thereby eliminate duplicate processing. When a request is received, the algorithm manager 28 first checks the cache, to determine if a valid response to the request is present. If so, the response is retrieved from the cache, and immediately provided to the API in response to the request.

Figure 3A:
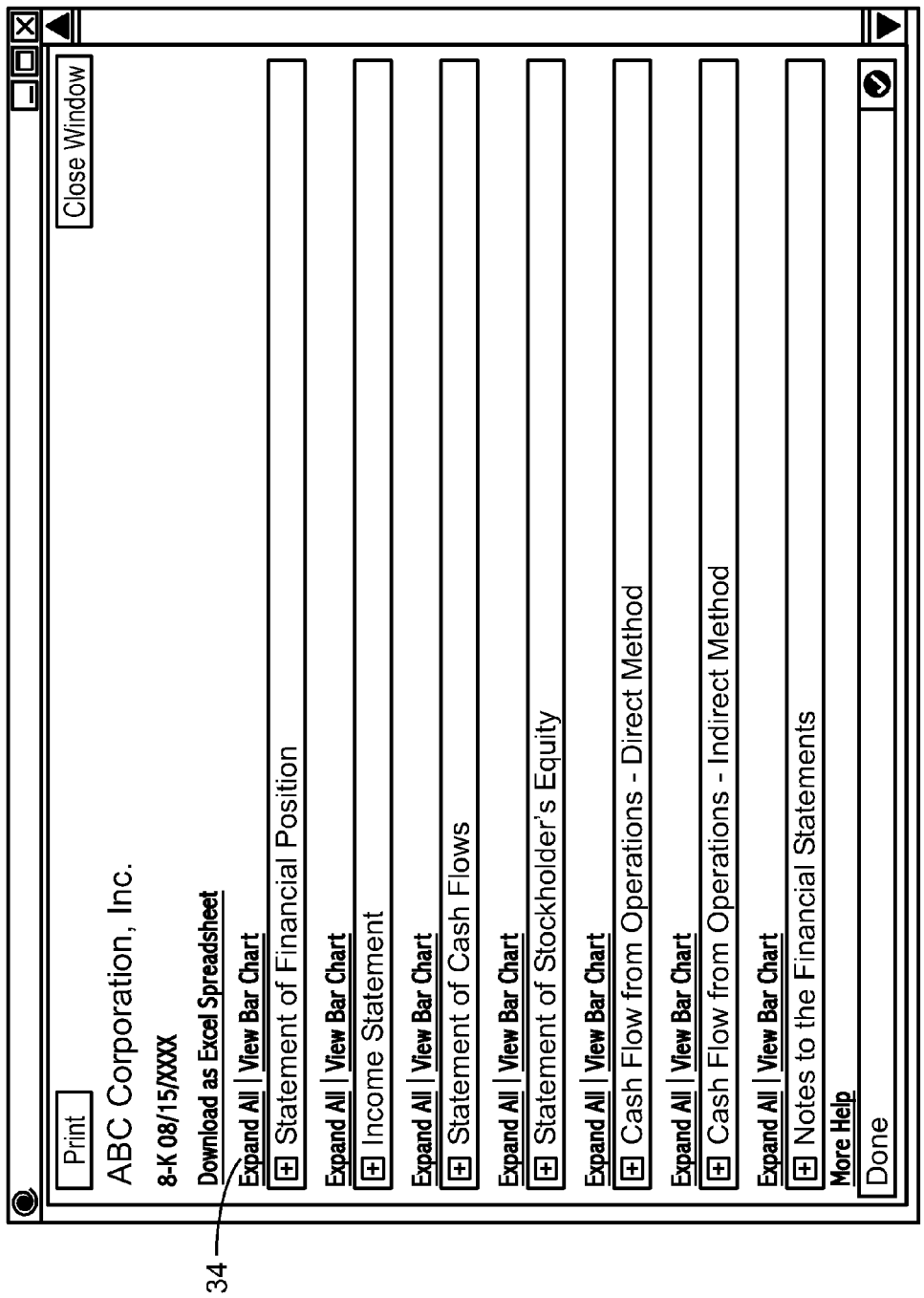

Examples of responses that might be displayed to a user via the browser interface are illustrated in FIGS. 3A-3E. In this particular example, the user has requested the latest filing of an 8-K Statement at the SEC for a particular company. FIG. 3A illustrates the initial screen that is presented to the user. This view presents a first-level listing of the sections of the statement. Each of these section headings are identified in the metadata for the filing, e.g. presentation links.

FIGS. 3B-3D illustrate views with progressively greater levels of detail in the first section "Statement of Financial Position", under the heading for "Assets", and numerical values corresponding to the various categories of assets. These numerical values, along with any dates to which they correspond and units of measurement, are retrieved from the instance documents themselves, whereas the displayed names for the asset categories are obtained from the metadata documents. Rather than select each successive level individually, the user can choose to expand and view all categories of data in the section at once, by selecting an appropriate button 34, as shown in FIG. 3E.

Figure 4:
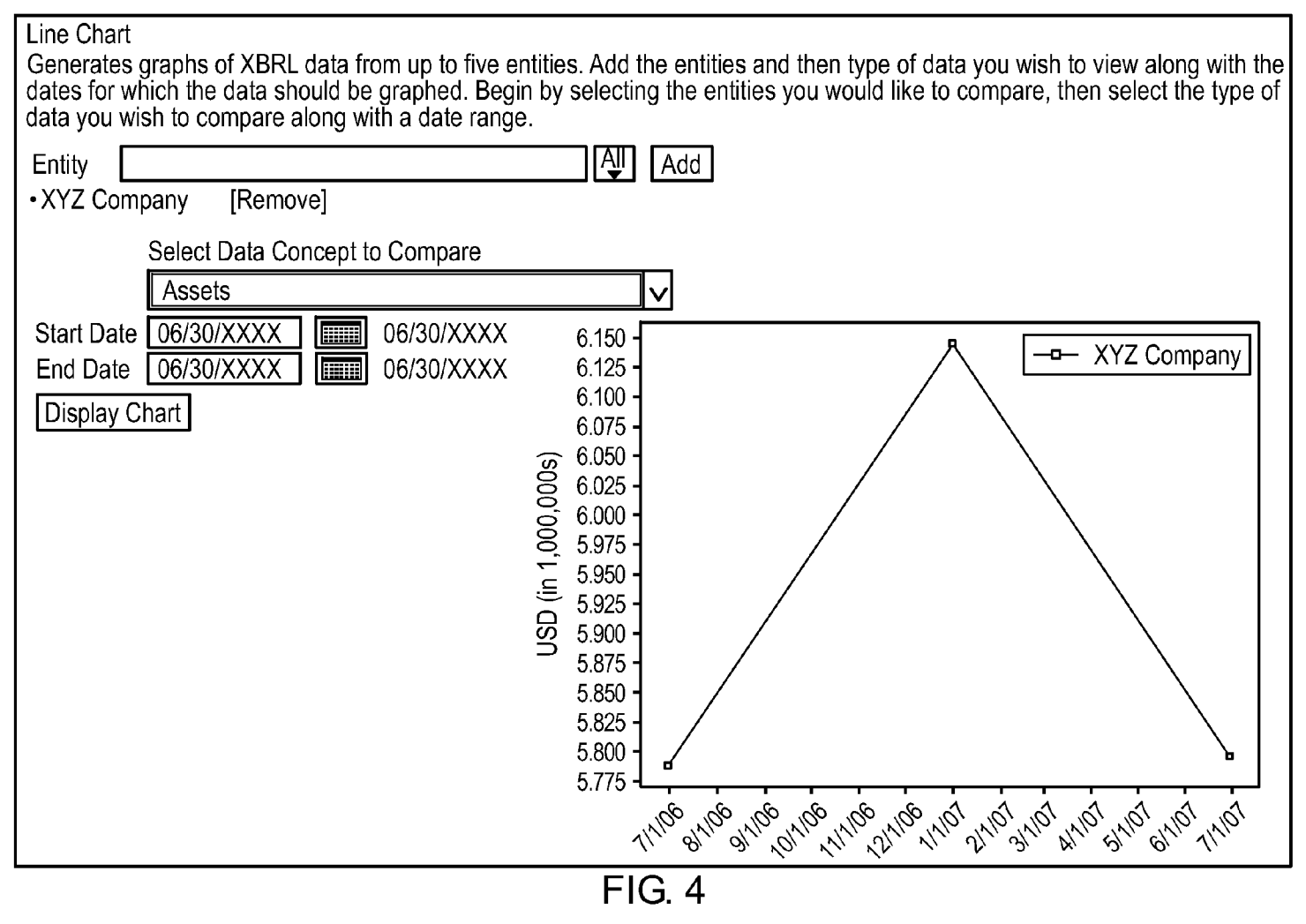

Since the data is presented in a tabular form, it can be easily reformatted and exported into a spreadsheet document. To this end, the browser window includes a command button, or link, 33, to enable the user to instruct the dynamic processor to perform such an operation. Within this capability, the data can also be presented in graphs, an example of which is depicted in FIG. 4. As such, the user can compare data for different companies, or different divisions within a company, over a given period of time.

In addition to retrieving data items that are contained in the instance documents and providing them in a view such as those shown in FIGS. 3A-3E, the algorithms in the dynamic processor also have the ability to calculate additional data that does not explicitly appear in the instance documents. For instance, in the example of FIGS. 3A-3E, the instance documents might contain items for each of the individual categories of assets, as shown in the view of FIG. 3D. However, they may not contain an item corresponding to the sum of all of the individual categories of assets, which is shown in FIG. 3B. In this case, the appropriate algorithm refers to the linkbase 22 to locate an equation which defines the items that make up the requested calculation. The algorithm then sends a query requesting each of those items, and sums them to obtain the desired total.

Since the dynamic processor dynamically reads the information in the XBRL documents in response to a request, rather than being hard-coded to process a particular Taxonomy, it is capable of uploading and processing any Taxonomy on demand, including both the base Taxonomy and any extensions. Thus, as new Taxonomies are developed, or new extensions are created for current Taxonomies, the dynamic processor is able to handle them immediately, rather that requiring an upgrade or redesign to accommodate new types of information.

Figure 5:
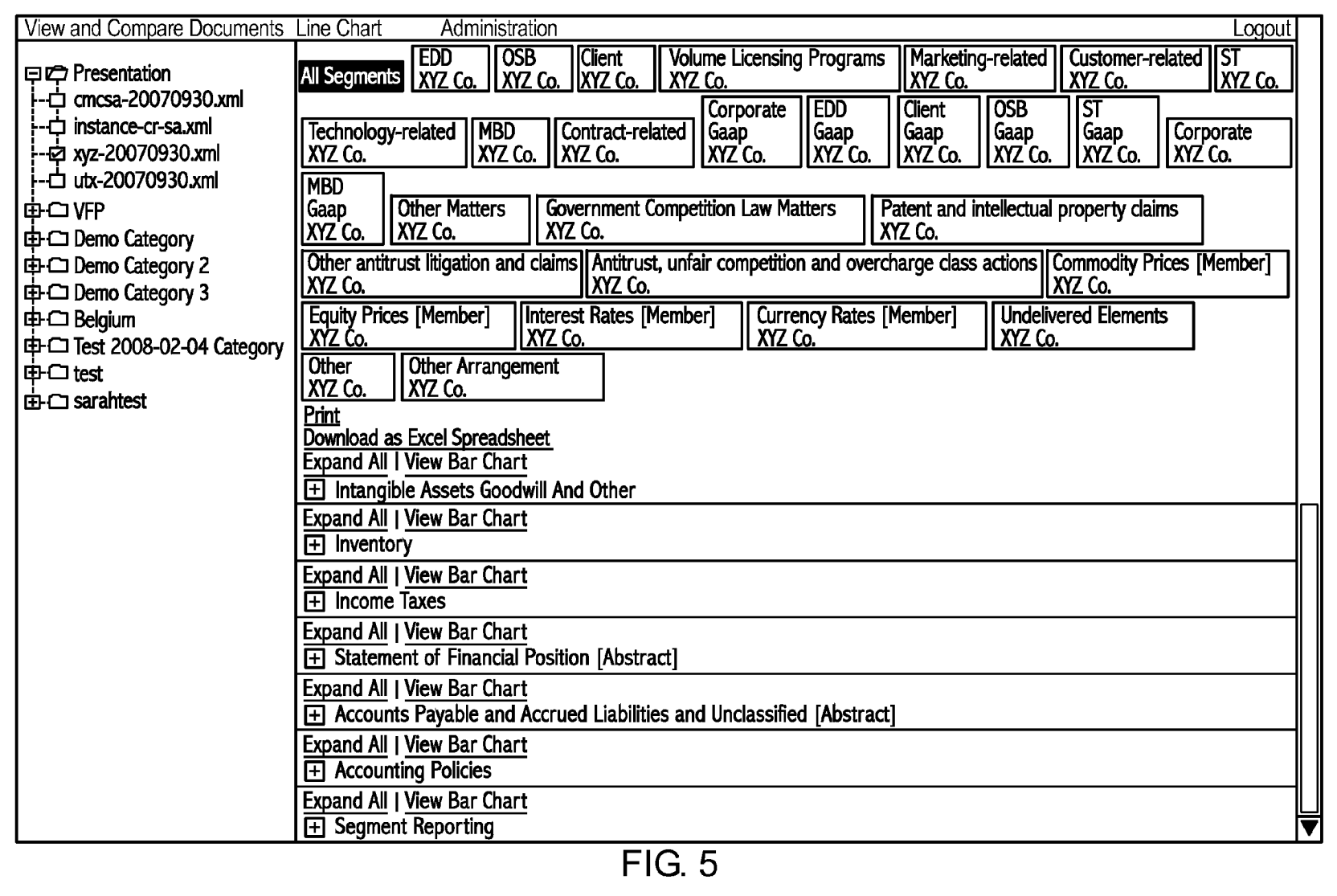

In this regard, a particular extension that has been developed for XBRL data is a specification known as dimensions. This specification enables the data to be further divided into desirable categories, for viewing and comparison purposes. For instance, a company structure might comprise a number of different segments, each of which has data allocated to it. When dimensions are incorporated into the Taxonomy for a company's financial documents, the dynamic processor enables the user to view the data that pertains to only one of the segments, or view the data of multiple segments in a side-by-side manner for comparison purposes. This is accomplished by reading the dimensions in the metadata of the documents. FIG. 5 illustrates one example of different segments for a company's financial data. Each segment has a corresponding tab on the user interface. In the illustrated example, the tab for "All Segments" is highlighted, indicating that the data for the entire company is displayed for each labeled category of information. By selecting any one of the segment-specific tabs, the displayed data can be confined to only that pertaining to the selected segment of the company's financial information.

It is possible that the labels for the data contained in XBRL documents can be presented in two or more different languages. For instance, some countries have more than one national language, and it may be desirable to view that data in any one of those languages. Likewise, a multi-national corporation may publish its data in the language of each of the countries where it has a presence. In such cases, the label linkbase in the taxonomy for those types of documents can contain multiple sets of labels, one for each language associated with the document. Thus, one set of labels may be in English, another corresponding set in French, etc.

FIG. 6 illustrates an example of an XBRL label linkbase containing labels in multiple languages. The particular label represented in this linkbase, in English, is "Assets". The first entry in the linkbase with the descriptor "xml:lang" corresponds to the English version of the label. This entry is followed by three other entries for the same label, which respectively pertain to the Spanish, French and German versions of the label.

Figure 7A:
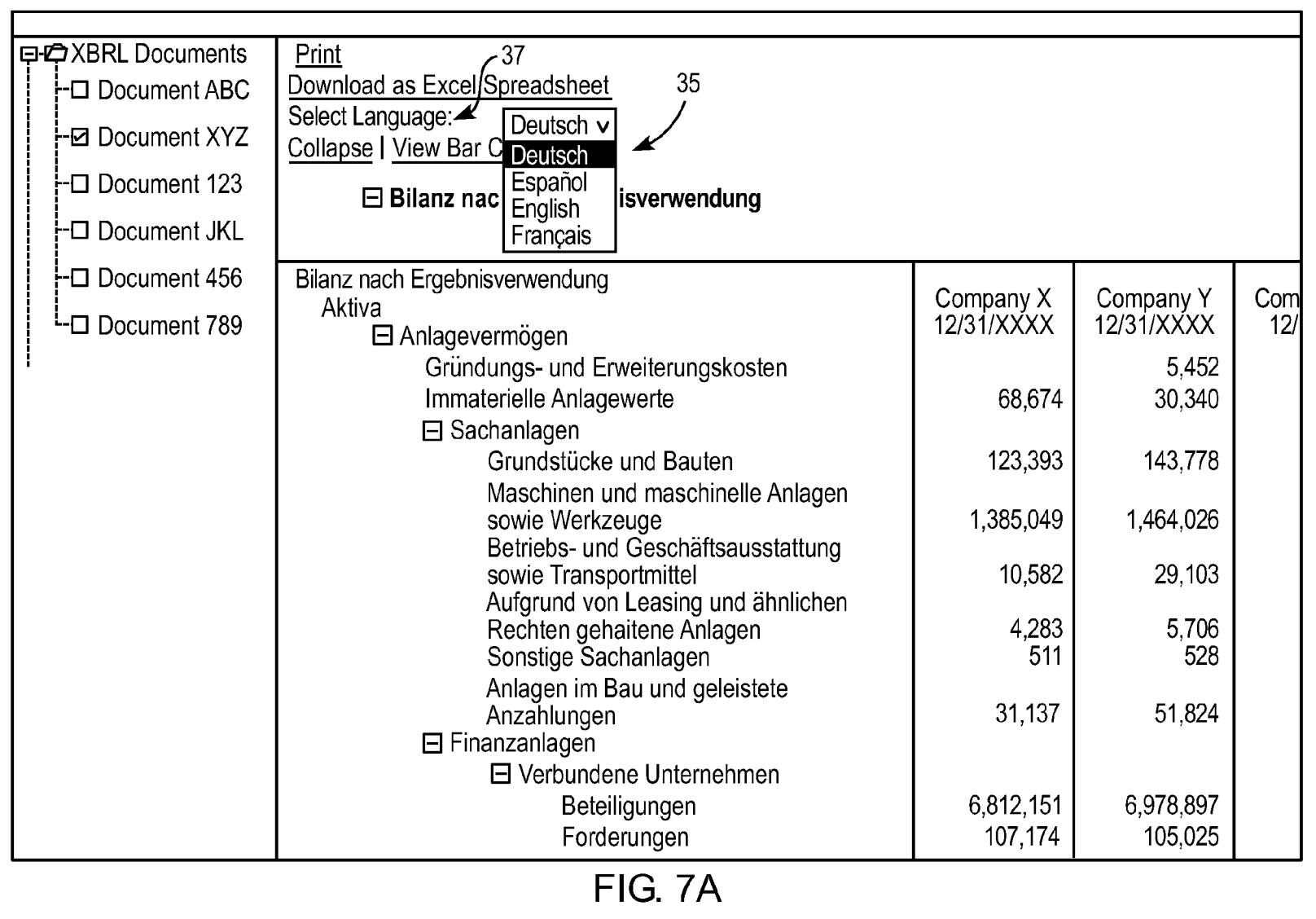

To accommodate this situation, a further feature of the invention dynamically assesses the languages associated with documents that are responsive to a request, and provides the user with an interface to select a desired one of the available languages. The interface can be in the form of a drop-down menu. An example of such a drop-down menu is shown in FIG. 7A, at 35. In this example, the data is presented with labels in the German language.

The dynamic processor provides the user with the ability to change the display language. The browser window is displayed with an interface element 37 labeled "Select Language". When the user clicks this element, the drop-down menu 35 appears. In the illustrated example, this menu contains four items, corresponding to the languages German, Spanish, English and French, in their respective native forms. This menu is dynamically generated and rendered by the dynamic processor. To do so, the dynamic processor examines the label linkbase to determine the available languages in the taxonomy, and displays each identified language as an item in the menu.

In the example of FIG. 7A, the menu item "Deutsch" is highlighted, corresponding to the display of the labels in the German language. FIG. 7B illustrates the effect when the user selects the "English" item from the menu. As can be seen, all of the data remains the same, but the labels associated with that data now appear in the English language. The dynamic processor achieves this result by retrieving the English-language version of the labels from the label linkbase. The change of the language can be carried out on a display-by-display basis, e.g. the summary screen may be displayed in one language, but the more detailed data for the same set of data can be displayed in another language.

The order in which the languages appear in the menu can be fixed. In accordance with another feature of the invention, the order can be varied in accordance with user preferences. For instance, the first time data responsive to a request is retrieved, it can be presented in the preferred language of the browser. This preferred language may be one of which is selected by the user when the browser is first installed.

Thereafter, the order of the languages in the menu can be revised in accordance with the selections made by the user. For instance, the most recent selection can appear at the top of the menu, followed by the next most recent selection, and so on. In the example of FIGS. 7A and 7B, the preferred language for the browser might be English, as indicated by the textual items in the browser window that are not related to the XBRL data. However, the selection for German appears at the top of the menu, since this was the most recent choice made by the user. Each time a user selects a new language, that selection can be brought to the top of the list. The dynamic processor can store the order of the selections, e.g. in the cache 33, and use that stored information to determine the order of appearance of the languages in the drop-down menu.

Not every label may be available in all of the indicated languages. For instance, in the example given in FIG. 6, the label "Assets" has four associated languages, but the linkbase for another label may only contain two languages, e.g. English and French. In this case, when displaying the labels, the dynamic processor steps through the languages in the order in which they are listed in the menu. For the "Assets" label, the German version is selected for display. In the case of the other label, German and Spanish versions are not available, so the English label is chosen, since it is the highest ranked language of those that are contained in the linkbase for that label.

In the examples depicted in FIGS. 7A and 7B, only the labels for the XBRL data are displayed in the selected language, and the remaining text in the browser window, e.g. commands, appear in the selected language of the browser. In an alternative implementation, the selection of a language can be applied to all text appearing in the browser window, to the extent supported by the language capabilities of the browser itself, rather than just the content retrieved from the XBRL documents.

Figure 8:
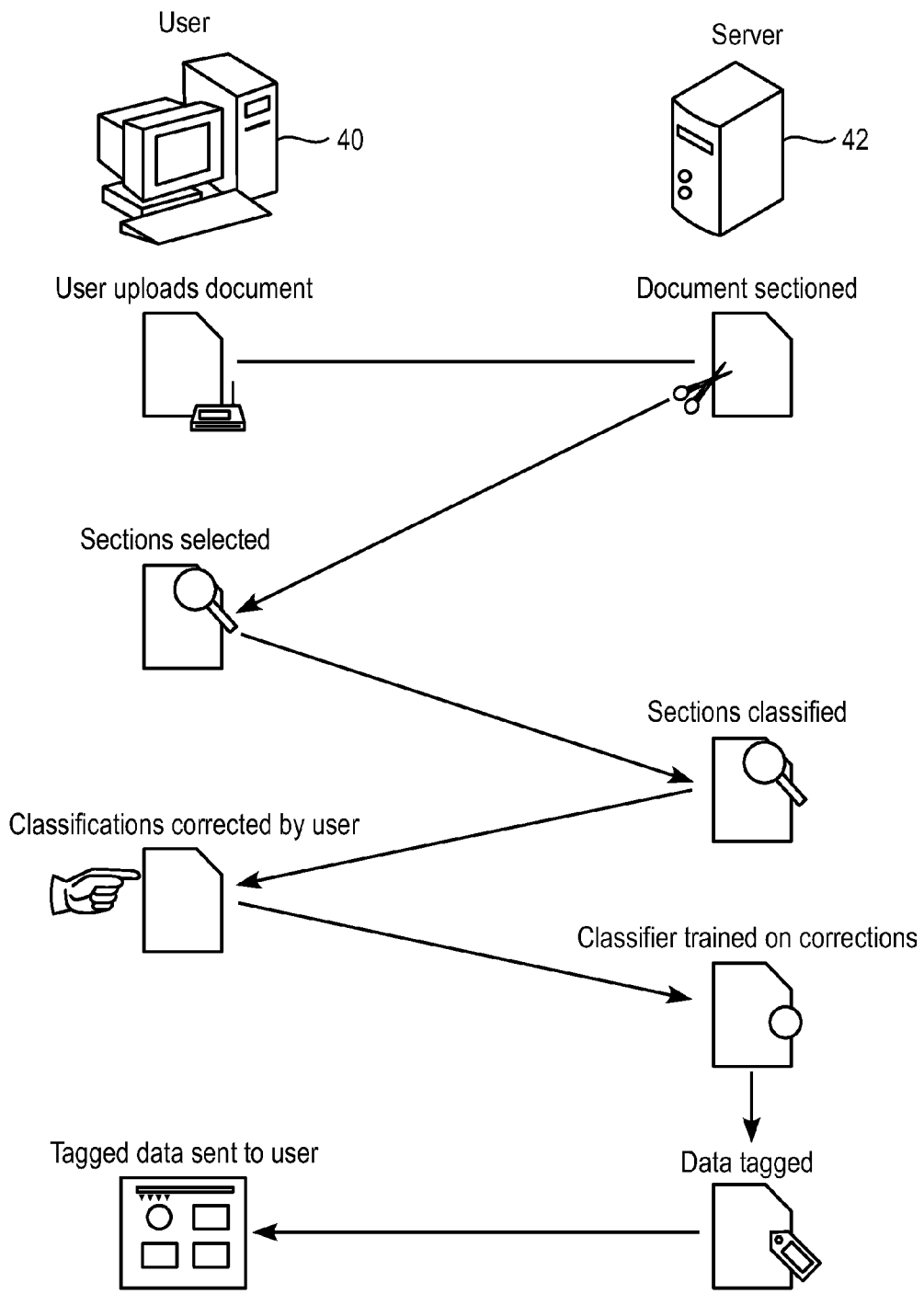
FIG. 8 is a schematic flow diagram of the procedure for converting an unstructured document into an XML-compliant format.

In accordance with another feature of the invention, a user interface provides an interactive tool to assist users in the conversion of unstructured documents into tagged formats that can be analyzed and viewed in accordance with the foregoing concepts. FIG. 8 is a schematic flow diagram illustrating the general steps that are performed in the conversion process according to one embodiment of the invention. Initially, a user uploads a document from his or her local computer 40 to a server 42. The document can be unstructured, in the sense that it does not contain any tags to identify different elements of data contained within the document, e.g. it might be a plain text document, html, pdf, or other such format.

Upon receiving a command to convert the uploaded document, a converter application executing in the server 42 sections the document into different components. The user selects one or more sections, and the application then provides an initial classification of a section by parsing the content of the section and assigning a concept to each identifiable fact item that is detected during the parsing. The classified fact items are then forwarded to the user's local computer 40 for review and correction.

The converter application automatically identifies and classifies the fact items. The results of this process improve by virtue of an iterative learning process. At first, the converter application may not have any knowledge base from which to identify and/or classify fact items, and therefore might not return any identified facts to the user or suggest a classification for them. Once the user reviews and revises, or adds, classifications to facts, the correctly labeled facts are forwarded to the converter application for training purposes. For example, the application might operate in the manner of a Bayes classifier to determine the most likely concept for an identified fact, based upon its content and its context within the document. When the corrected facts are forwarded to the converter application, it can employ the information provided by the user to update the probabilities that various respective concepts might be associated with a given fact item. The next time a document is presented for classification, the classifier can utilize these updated probabilities to provide suggested labels for at least some of the identified fact items in that document.

After the training information has been obtained from the corrected concept items provided by the user, the document is tagged with the labels that have been associated with the concept items. For instance, if a fact item has been labeled as a "name", the opening tag <name> might be inserted into the result document immediately preceding the concept item, and the closing tag </name> might be inserted immediately after it. After the result document has been tagged, it is returned to the user, for example to be stored as an instance document.

FIGS. 9a and 9b illustrate an example of a user interface that can be employed to review and make corrections to the initial classifications that are automatically provided by the converter application. This interface can be sent from the server 42 to the local computer 40 as a web page to be displayed in a browser executing on the local computer, and/or be stored locally at the computer 40 as a client component of the converter application, e.g. on a disk drive or equivalent storage medium. Referring to FIG. 9a, a window 44 contains a pane, or frame, 46 in which the original document is displayed. The window also contains three command buttons, "Upload Document" 47, "Convert Document" 48, and "Tag Document" 50. When the user clicks on the "Upload Document" button 47, the application sections the document into tables and blocks of text, and allows the user to select one or more sections for classification.

Thereafter, when the user clicks on the "Tag Document" button 50, the selected sections are parsed to identify facts and determine probable matching concepts, and an interactive window 52 appears in the foreground, as shown in FIG. 9b. This window has an upper pane 54 in which fact items from the document are presented. In the illustrated example, the pane 54 contains a table from the underlying document listing comprehensive income for the years 2005, 2006, and 2007.

A lower pane 56 of the window 52 provides the user with the ability to correct concepts for the fact items. In a first column 58, drop-down menus enable the user to select a concept from a list of suggested concepts, ordered by probability of match. These concepts are derived from analysis of the text label in the table for a group of facts. In the second column 60, the label for a group of facts is displayed. In the third column 62, the facts sharing that label are displayed. In the illustrated example, the first label is "Net Income", the facts for that label are $679.3, $411.0, and $513.6 (in millions of dollars), and the suggested concept for that label is "NetIncomeLoss". These fact items were automatically identified by the application when the user selected that table for processing.

In a similar manner, every other relevant fact item appearing in the upper pane 54 can be associated with a concept. Once the user has completed the review and correction of concepts, a "Tag" button 64 on the window 52 is activated. This causes the corrected set of concepts, and associated fact items, to be forwarded to the server application. The user may then click the "Convert Document" button 48, to cause the application to generate an XBRL document containing the tagged facts and return it to the user.

The parsing function of the server application has two principal objectives. The first of these objectives is to correctly extract the following data from various table formats across a population of documents, e.g. HTML SEC filings, which will then be stored in an XML-compliant instance document:
- Facts
- Monetary Precision
- Monetary multiplier
- Context Date Information.

This information is retrieved using a table profiler which first scans a table to derive an overall description of the table indicating where the facts, headers, monetary symbols, and labels are located. The parser also uses this information to associate facts with the correct contextual header information.

The second objective of the parser is to extract meaningful text to classify a line item as accurately as possible. In this regard, the parser detects not only the label for each line item of the table, but also recognizes nested labels as a human would read them, in order to provide more accurate classification text. Nested labels can be evaluated by examining indenting structure, centering, and font weight. Additionally, the parser can identify to the classifier the nesting level of each label, to allow the classifier to better classify each line item.

The application also contains functionality to use existing unstructured documents, paired with previously-generated XBRL data, to produce training data for the automatic classification. Initially the user uploads an unstructured document and an XBRL instance document to the application. The application parses the unstructured document and sections it into different components. The user selects one or more sections, and the application parses the sections to identify facts and their associated label. For each label, the application scans the XBRL instance document for sets of tagged facts that match the collection of unstructured facts and that share the same concept. The possible concepts are then assigned to each label and presented to the user for review and correction. When the user confirms the concept associated with each label, these associations are added to the application knowledge base. Alternatively, the application may present the user with a file describing these associations, which may be added to the application knowledge base in a separate process.

Optionally, the application may employ heuristics to present the list of possible concepts in a particular order, to indicate which of many concepts seems to be a more accurate match. For instance, the application could examine concepts for which there is only one possible context match, and prioritize possible matches for other concepts that share the same context attribute value.

An interface similar to that for classifying facts in an unstructured document, such as the example illustrated in FIG. 9b, can be used for this process. The first column 58 can contain a list of concepts that describe matching facts, e.g. the first row indicates there are three facts in the XBRL instance document matching 679.3, 411.0, and 513.6, all with the concept "NetIncomeLoss". The user may click the "Tag" button 64 to save any corrections to the identified matching concept, and then the "Convert Document" button 48 to generate a file describing these associations.

Using the foregoing features of the invention, an unstructured document, e.g., an HTML document, is converted into a structured XML-compliant document. In certain applications of these features, it may be desirable to ensure that the converted document, when rendered, appears the same as the original unstructured document. For example, the SEC requires that a rendered XBRL document have the same appearance as the original HTML filing. It may be the case, however, that one or more terms appearing in the original document, e.g., table headers, do not have corresponding concept labels in the referenced XBRL taxonomy. For example, a line item in a table of the original HTML document might be labeled "Cash and Cash Equivalents, whereas the closest matching concept has a label (found in the label linkbase) that reads "Cash". Consequently, if this label is used for rendering the XBRL document, it will not have the same appearance as the original HTML document.

In order to meet the objective of matching appearances between the two documents, the XBRL instance document should reference an extension linkbase that is based upon the original HTML document. In accordance with a further feature of the invention, a user interface is provided for the automatic generation of such an extension linkbase that is derived from the original HTML document.

Figure 10A:
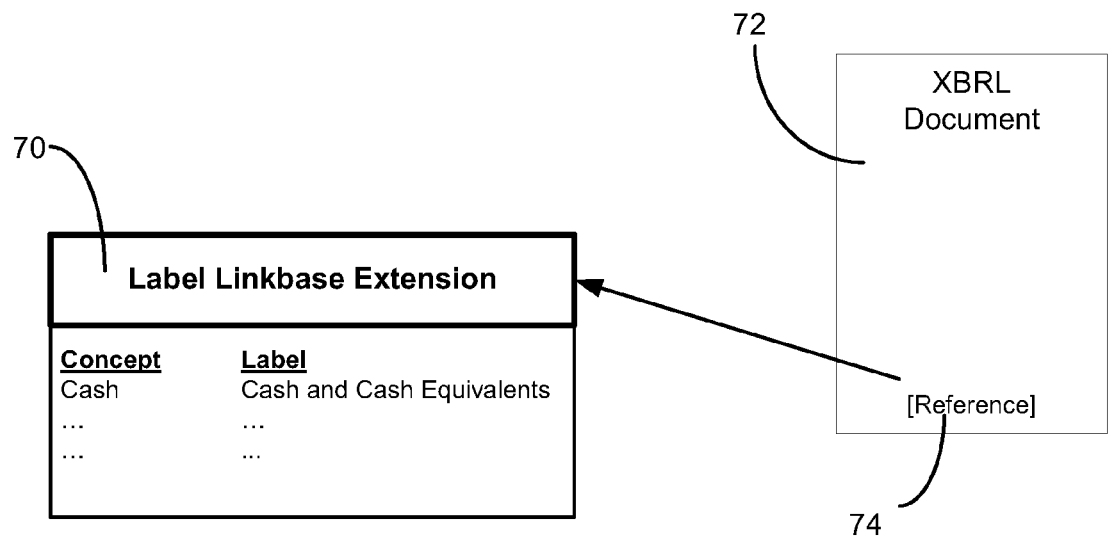
FIG. 10A illustrates an extension document for a taxonomy that is referenced by a structured document.

In some instances, an appropriate concept for a given line item may exist in the taxonomy, but the label associated with that concept may not match the label appearing in the original unstructured document. At a first level of functionality, the server application generates an extension containing a new label for each concept. For example, referring to the user interface of FIG. 9b, the application compares the label appearing in column 60 to the label of the original document, as it appears in the window pane 54. If these two labels do not match, the server application automatically generates a label linkbase extension document 70, as depicted in FIG. 10a. Each new label in the extension is the same as the corresponding label appearing in the original HTML document. The XBRL document 72 being created includes a reference 74 to this extension document, so that, when the XBRL document is rendered, it is displayed with the same label as the original unstructured document.

Figure 10B:
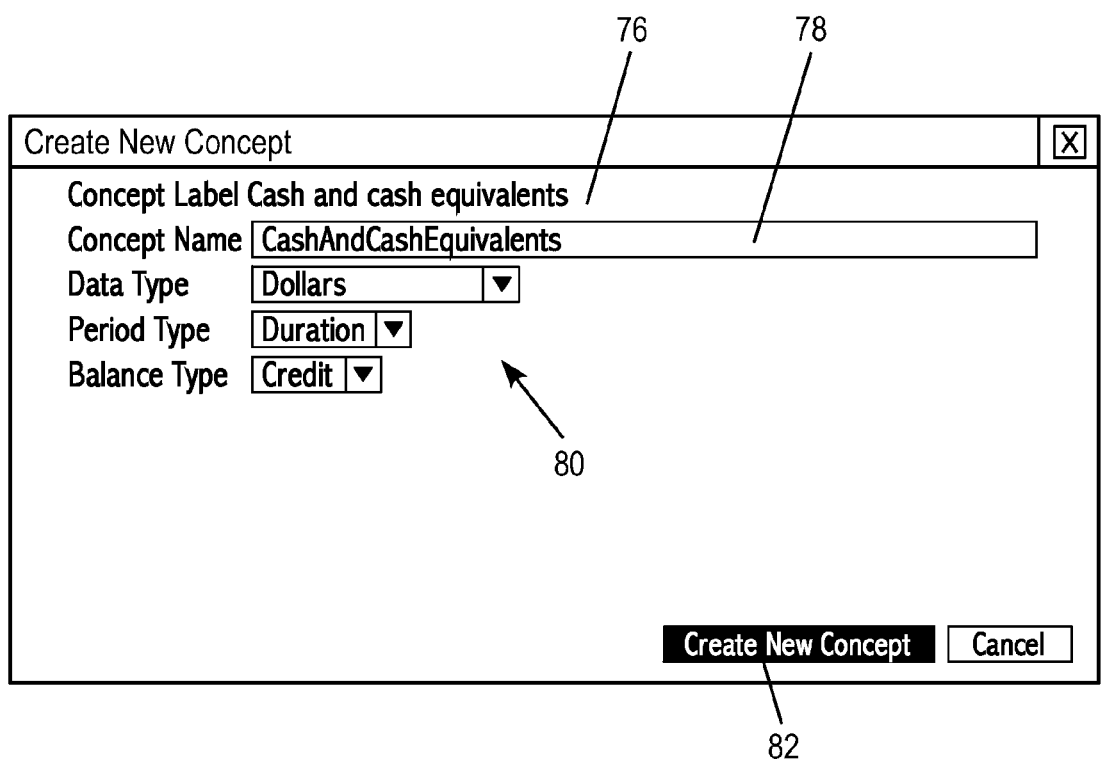

In other situations, there may be no matching concept in the existing taxonomy for a particular line item of the original document. To accommodate this situation, the user interface includes a second level of functionality that enables the user to create a new concept. Referring again to the interface of FIG. 9b, column 58 contains drop-down menus with suggested concepts for each of the sets of facts appearing in the original document. If none of the suggested concepts in the drop down menu is appropriate for a particular set of facts, the final entry in the menu might be an option to add a new concept. When that option is selected, a dialogue box appears. One example of such a dialogue box is illustrated in FIG. 10b.

The first line of the dialogue box contains a label 76 that is obtained from the original HTML document. The second line of the dialogue box includes a text entry field 78 that enables the user to create the name of the concept to be associated with that label. As a default, a proposed name can be automatically inserted, by removing punctuation and spaces from the displayed label, and capitalizing the first letter of each word, as depicted in FIG. 10b. The user then has the option to edit this suggested concept name, as desired.

Additional fields in the dialogue box have associated drop down menus 80 that can be used to assign attributes to the concept. In the illustrated example, these attributes include a Data Type, a Period Type and a Balance Type. The Data Type attribute has an associated drop-down menu that enables the user to select different possible values, e.g. monetary units such as "Dollars", per-share values or number of shares. The drop-down menu for the Period Type attribute may offer values such as Duration or Instant. The Balance Type menu may enable the user to select values such as Credit and Debit. Once the user has entered the desired name and selected the appropriate attribute values, a "Create New Concept" button 82 is clicked. Upon clicking this button, a new extension schema file is created that contains the concept information, and this extension file is referenced by the XBRL document that is being generated.

At a third level of functionality, a presentation linkbase extension is created to ensure consistency in the structure of the original and converted documents. The original document is analyzed to determine which concepts are depicted in a table, and in what order. This analysis also notes the nesting, i.e. indenting, of concepts within the table. A presentation linkbase extension file is created to record the structure of the table. This extension is also referenced by the XBRL document, and overrides the original presentation linkbase of the Taxonomy when the XBRL document is rendered.

Another linkbase that can be created with this functionality is a calculation linkbase. This linkbase enables a value to be validated by indicating which concepts contribute to a separate concept, either positively or negatively. FIG. 10*c* illustrates an example of a user interface for implementing this functionality. The example depicted in the figure pertains to an income statement. In such a statement, operating income is calculated as net income minus operating expenses. In the lower pane 84 of the user interface, each row corresponding to a line item of the statement includes a pair of check boxes 86 that are respectively associated with the addition and subtraction operands. In the figure, the user has selected the row for "Total", which represents the cumulative operating expenses, and placed a check in the box associated with the subtraction operand. The figure also shows that the user has previously checked the addition box for the "Net Sales" line item. A calculation linkbase is created in which these two checked items, and their associated positive or negative attributes, are linked to the "Operating Income" concept. When the XBRL document is rendered, the data values for these two concepts can be algebraically summed to validate the data value for the Operating Income concept.

Similar to the case of user-assisted classification, existing documents can also be employed for the automatic generation of new extension documents. The user can upload existing extension documents, which can be employed to augment the candidate list of concepts to which facts can be matched. Any uploaded label linkbase that is associated with the extension can be used to train the server application program on the extension concepts. Once the user has labeled the concepts, the application program automatically creates a new set of extension documents based upon the uploaded extension documents and the parsed unstructured document.

In one embodiment of the invention, the foregoing functions to convert an unstructured, or partially structured, document into an XML-compliant document can be implemented by the dynamic processor 14. In another embodiment, these functions can be performed by a different processor that has access to the Taxonomy being used to define the elements of the document. The converter application can be stored as a program on a suitable computer-readable storage medium that is accessible by the processor, e.g. a hard disk drive, an optical drive, a flash memory, etc.

The dynamic processor can be implemented within different software environments. In one implementation, the dynamic processor can reside as a stand alone desktop application, which communicates with one or more repositories of XBRL documents that are accessible via a desktop computer, for example through a network. In another implementation, the dynamic processor can be implemented as a client-server program. For instance, the components illustrated in FIG. 2 might reside in a server that is associated with the information repository, and the API can communicate with a client executing on a computer at a user's site, via HTML. As a third implementation, the data processor might be a web-based application executing on a server that a user accesses through a suitable browser. In each case, the software components that constitute the API and the dynamic processor are encoded on a computer-readable medium that is accessed by the supporting server and/or desktop computer.

Thus it can be seen that the present invention provides dynamic evaluation of XML documents in response to a request, notwithstanding the diverse amount of metadata that can result with an extensible language. This is accomplished by analyzing the metadata to learn about the structure and semantics that are employed for any given set of XML documents. As a result, the need to pre-parse documents to derive data from them is avoided. Furthermore, unstructured documents can be semi-automatically converted into XML-compliant documents by means of a classifier that adaptively learns the most appropriate labels to apply to fact items in the documents.

It will be appreciated by those of ordinary skill in the art that the invention described herein can be embodied in other specific forms without departing from the spirit or essential characteristics thereof. The disclosed implementations are considered in all respects to be illustrative, and not restrictive. The scope of the invention as indicated by the appended claims, rather than the foregoing description, and all changes that come within the meaning and range of equivalents thereof are intended to be embraced therein.

What is claimed is:

1. A system for converting unstructured documents into XML-compliant documents, said system comprising:
   a processor configured to execute instruction for performing the following operations:
      sectioning an unstructured document into tables containing text and blocks of text, the text comprising unstructured data, without tags identifying the data;
      receiving a user-selected portion of the unstructured document comprising the unstructured data;
      a parsing the user-selected section of the unstructured document automatically, without human intervention, to identify fact items and associated respective human-readable labels;
      comparing labels with a library of XBRL taxonomy concepts to associate one or more probable taxonomy concepts with each label;
      forwarding the fact items, labels, and respective probable associated taxonomy concepts to the user;
      receiving optional correction of associated possible taxonomy concepts, by the user, which may comprise new taxonomy concepts not originally in the library, selection of a correct concept from the probable concepts previously associated with a respective label or association of one or more previously associated labels with a different taxonomy concept from the library of XBRL taxonomy concepts;
      generating a structured XML-compliant document comprising the fact items, associated labels and associated concepts as XML tags;
      upon receipt of new XBRL taxonomy concepts from the user, generating an extension document for a taxonomy that contains the new concepts, wherein
      the XML-compliant document contains a reference to the extension document; and
   an interface that executes on a client computer to present the probable matching concepts associated with fact items and labels, and to enable the user to enter new concepts for inclusion in the extension document.

2. The system of claim 1, wherein the processor further identifies the structure of entries in the table during the parsing of the user-selected section of the unstructured document, and generates a presentation linkbase extension for taxonomy corresponding to the identified structure.

3. The system of claim 2, wherein the structure of the table includes the order of items in the table.

4. The system of claim 3, wherein the structure of the table further includes the nesting of items within the table.

5. The system of claim 1, wherein said interface enables a user to upload an existing extension document, and said processor further comprises:
   receiving an exemplar structured document comprising fact items and associated taxonomy concepts;
   comparing each label, identified from the unstructured document, with each label and associated concepts in the exemplar structured document; and
   assigning one or more probable concepts to each label identified in the unstructured document based on the concepts in the exemplar structure document.

6. A system for converting unstructured documents into XML-compliant documents, comprising:
   a processor configured to execute the following operations:
      section a document into tables and blocks of text,
      parse a user-selected section of a document to identify fact items and their human-readable labels,
      process identified labels with XBRL taxonomy concepts to associate a list of probable matching concepts,
      forward the fact items, labels, and concepts to the user for review and correction,
      upon receipt of new XBRL taxonomy concepts from the user,
      generate an extension document for a taxonomy that contains the new concepts;
      include a reference to the extension document in the XML-compliant document; and
   an interface that executes on a client computer to present the probable matching concepts associated with labels and fact items, and to enable the user to enter new concepts for inclusion in the extension document,
   wherein said processor is further configured to determine whether a label for a fact item in the unstructured document matches the label corresponding to a concept associated with the fact item and, if the labels do not match, to automatically generate an extension document containing a label that matches the label in the unstructured document.

7. A system for converting unstructured documents into XML-compliant documents, comprising:
   a processor configured to execute the following operations:
      section a document into tables and blocks of text,
      parse a user-selected section of a document to identify fact items and their human-readable labels,
      process identified labels with XBRL taxonomy concepts to associate a list of probable matching concepts,
      forward the fact items, labels, and XBRL taxonomy concepts to the user for review and correction,
      upon receipt of new XBRL taxonomy concepts from the user,
      generate an extension document for a taxonomy that contains the new concepts;
      include a reference to the extension document in the XML-compliant document; and
   an interface that executes on a client computer to present the probable matching XBRL taxonomy concepts associated with labels and fact items, and to enable the user to enter new concepts for inclusion in the extension document,
   wherein said interface enables a user to identify concepts whose data items are algebraically summed to form the data item for another concept, and wherein said processor is further configured to create a linkbase that links the identified concepts to said other concept.

8. A computer-readable medium containing program instructions which, when executed by a processor, cause the processor to perform the following operations:
   sectioning an unstructured document into tables containing text and blocks of text, the text comprising unstructured data, without tags identifying the data;
   receiving a user-selected portion of the unstructured document comprising the unstructured data;
   parsing the user-selected section of the unstructured document automatically, without human intervention, to identify fact items and associated respective human-readable labels;
   comparing labels with a library of XBRL taxonomy concepts to associate, one or more probable concepts with each label;
   forwarding the fact items, labels, and respective associated concepts to the user;
   receiving optional correction of associated possible taxonomy concepts, by the user, which may comprise new taxonomy concepts not originally in the library, selection of a correct concept from the probable concepts previously associated with a respective label or association of one or more previously associated labels with a different taxonomy concept from the library of XBRL taxonomy concepts;
   generating a structured XML-compliant document comprising the fact items, associated labels and associated concepts as XML tags;
   upon receipt of new XBRL taxonomy concepts from the user, generating an extension document for a taxonomy that contains the new concepts wherein the XML-compliant document contains a reference to the extension document; and
   causing an interface to be displayed on a client computer to present the probable matching concepts associated with labels and fact items, and to enable the user to enter new concepts for inclusion in the extension document.

9. The computer-readable medium of claim 8, wherein the program instructions further cause the processor to identify the structure of entries in a table during the parsing of the user-selected section of the unstructured document, and generates a presentation linkbase extension for taxonomy corresponding to the identified structure.

10. The computer-readable medium of claim 9, wherein the structure of the table includes the order of items in the table.

11. The computer-readable medium of claim 10, wherein the structure of the table further includes the nesting of items within the table.

12. The computer-readable medium of claim 8, wherein said interface enables a user to upload an existing extension document, and the program instructions further comprises:
   receiving an exemplar structured document comprising fact items and associated taxonomy concepts;
   comparing each human-readable label, identified from the unstructured document, with each label and associated concepts in the exemplar structured document; and
   assigning one or more probable taxonomy concepts to each label identified in the unstructured document based on the concepts in the exemplar structure document.

13. The computer-readable medium of claim 8, wherein the program instructions further cause the processor to determine whether a label for a fact item in the unstructured document matches the label corresponding to a concept associated with the fact item and, if the labels do not match, to automatically generate an extension document containing a label that matches the label in the unstructured document.

14. The computer-readable medium of claim 8, wherein said interface enables a user to identify concepts whose data items are algebraically summed to form the data item for another concept, and wherein the program instructions further cause the processor to create a linkbase that links the identified concepts to said other concept.

15. A method for converting unstructured documents into XML-compliant documents, comprising:
sectioning an unstructured document into tables containing text and blocks of text, using a processor, the text comprising unstructured data, without tags identifying the data;
receiving a user-selected portion of the unstructured document comprising the unstructured data;
parsing the user-selected section of the unstructured document automatically, without human intervention, using the processor to identify fact items and respective human-readable labels;
comparing the human-readable labels with a library of XBRL taxonomy concepts to associate one or more probable concepts with each label, using the processor;
forwarding the fact items, labels and respective associated concepts to the user, to be displayed on a user interface;
receiving optional correction of associated possible taxonomy concepts, by the user, which may comprise new taxonomy concepts not originally in the library, selection of a correct concept from the probable concepts previously associated with the label or association of one or more previously associated labels with a different taxonomy concept from the library of XBRL taxonomy concepts;
generating a structured XML-compliant document comprising the fact items, associated labels and associated concepts as XML tags; and
upon receipt of new XBRL taxonomy concepts from the user, generating an extension document for a taxonomy that contains the new concepts, wherein the XML-compliant document contains a reference to the extension document.

16. The method of claim 15, further comprising identifying the structure of entries in a table during the parsing of the user-selected section of the unstructured document with the processor, and generating a presentation linkbase extension for taxonomy corresponding to the identified structure.

17. The method of claim 16, wherein the structure of the table includes the order of items in the table.

18. The method of claim 17, wherein the structure of the table further includes the nesting of items within the table.

19. The method of claim 15, wherein said interface enables a user to upload an existing extension document, and said method further comprises:
receiving an exemplar structured document comprising fact items and associated taxonomy concepts;
comparing each label, identified from the unstructured document, with each label and associated concepts in the exemplar structured document, using the processor; and
assigning one or more probable taxonomy concepts to each label identified in the unstructured document based on the concepts in the exemplar structure document, using the processor.

20. The method of claim 15, further comprising determining with the processor whether a label for a fact item in the unstructured document matches the label corresponding to a concept associated with the fact item and, if the labels do not match, automatically generating an extension document containing a label that matches the label in the unstructured document.

21. The method of claim 15, wherein said interface enables a user to identify concepts whose data items are algebraically summed to form the data item for another concept, and further including to creating a linkbase with the processor that links the identified concepts to said other concept.

22. A system for converting unstructured documents into XML-compliant documents, said system comprising:
a processor configured to execute the following operations:
receiving an exemplar structured document comprising fact items and associated XBRL taxonomy concepts;
sectioning an unstructured document into tables containing text and blocks of text, the text comprising unstructured data, without tags identifying the data;
receiving a user-selected portion of the unstructured document comprising the unstructured data;
parsing the user-selected section of the unstructured document automatically, without human intervention, to identify fact items and associated respective human-readable labels;
comparing each human-readable label, identified from the unstructured document, with each label and associated concepts in the exemplar structured document;
assigning one or more probable concepts to each label identified in the unstructured document based on the concepts in the exemplar structure document;
forwarding the fact items, labels, and respective associated concepts to the user; and
generating a structured XML-compliant document comprising the fact items, associated labels and associated concepts as XML tags, wherein the XML-compliant document contains a reference to an extension document associated with the exemplar structured document; and
an interface that executes on a client computer to present the probable matching concepts associated with fact items and labels, and to enable the user to enter new concepts for inclusion in the extension document.

23. The system of claim 22, wherein the processor is further configured to execute the following operations:
receiving optional correction of associated possible taxonomy concepts, by the user, which may comprise new taxonomy concepts not originally in the extension document, selection of a correct concept from the probable concepts previously associated with the respective label or association of one or more previously associated labels with a different taxonomy concept from the extension document; and
upon receipt of new concepts from the user, updating the extension document.

24. The system of claim 22, wherein the processor is further configured to execute comparing labels with a library of XBRL taxonomy concepts to associate one or more probable taxonomy concepts from the library with the respective label.

25. A method for converting unstructured documents into XML-compliant documents, said method comprising:
receiving an exemplar structured document comprising fact items and associated XBRL taxonomy concepts;

sectioning an unstructured structured document into tables containing text and blocks of text, using a processor, the text comprising unstructured data, without tags identifying the data;

receiving a user-selected portion of the unstructured document comprising the unstructured data;

parsing the user-selected section of the unstructured document automatically, without human intervention, using the processor, to identify fact items and associated respective human-readable labels;

comparing each human-readable label, identified from the unstructured document, with each label and associated concepts in the exemplar structured document, using the processor; and assigning one or more probable concepts to each label identified in the unstructured document based on the concepts in the exemplar structure document, using the processor;

forwarding the fact items, labels, and respective associated concepts to the user; and generating a structured XML-compliant document comprising the fact items, associated labels and associated concepts as XML tags, wherein the XML-compliant document contains a reference to an extension document associated with the structured document.

26. The method of claim 25, further comprising:

receiving optional correction of associated possible taxonomy concepts, by the user, which may comprise new taxonomy concepts not originally in the extension document, selection of a correct concept from the probable concepts previously associated with the respective label or association of one or more previously associated labels with a different taxonomy concept from the extension document; and upon receipt of new concepts from the user, updating the extension document.

27. The method of claim 25, further comprising comparing labels with a library of XBRL taxonomy concepts using the processor to associate one or more probable taxonomy concepts from the library with the respective label.

* * * * *